United States Patent (10) Patent No.: US 8,132,448 B2
Nakamura et al. (45) Date of Patent: Mar. 13, 2012

(54) STEAM TURBINE TEST FACILITY, LOW-LOAD TEST METHOD, AND LOAD DUMP TEST METHOD

(75) Inventors: Tateki Nakamura, Mito (JP); Takeshi Kudo, Hitachinaka (JP); Naoaki Shibashita, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 126 days.

(21) Appl. No.: 12/644,243

(22) Filed: Dec. 22, 2009

(65) Prior Publication Data

US 2010/0162802 A1 Jul. 1, 2010

(30) Foreign Application Priority Data

Dec. 25, 2008 (JP) ................................. 2008-331247

(51) Int. Cl.
 *G01M 15/14* (2006.01)
(52) U.S. Cl. .................................................... 73/112.02
(58) Field of Classification Search ... 73/112.01–112.04
See application file for complete search history.

(56) References Cited

U.S. PATENT DOCUMENTS

| | | | |
|---|---|---|---|
| 3,998,052 A * | 12/1976 | Easter | 60/413 |
| 4,538,455 A * | 9/1985 | Klufas | 73/112.02 |
| 4,891,948 A * | 1/1990 | Kure-Jensen et al. | 60/645 |
| 4,995,257 A * | 2/1991 | Leon | 73/112.02 |
| 5,333,457 A * | 8/1994 | Silvestri, Jr. | 60/646 |
| 6,898,540 B2 * | 5/2005 | Davies | 702/85 |
| 7,021,126 B1 * | 4/2006 | Badami et al. | 73/112.03 |
| 7,028,479 B2 * | 4/2006 | Gobrecht et al. | 60/646 |
| 2010/0089136 A1 * | 4/2010 | Luneburg | 73/112.01 |

* cited by examiner

*Primary Examiner* — Freddie Kirkland, III
(74) *Attorney, Agent, or Firm* — Mattingly & Malur, P.C.

(57) ABSTRACT

A steam turbine test facility 1 includes a test steam turbine 2 which simulates the behavior of a real steam turbines 11 included in the steam turbine plant 10, and a motor-generator 4 connected to the test steam turbine 2. A control unit 5 included in the motor-generator 4 controls the motor-generator 4 to change the rotational speed of the test steam turbine 2 based on an arbitrarily set speed change pattern. The speed change pattern is set such that the test steam turbine 2 in the load disconnection state simulates a time-profile of the rotational speed of the steam turbines 11 with the load disconnected.

5 Claims, 3 Drawing Sheets

10 STEAM TURBINE PLANT

1 STEAM TURBINE TEST FACILITY

STEAM TURBINE TEST FACILITY, LOW-LOAD TEST METHOD, AND LOAD DUMP TEST METHOD

BACKGROUND OF THE INVENTION

1. Field of the Invention

The present invention relates to a steam turbine test facility for performing tests for performance and reliability verification of a steam turbine plant, a low-load test method using the steam turbine test facility, and a load dump test method using the same.

2. Description of the Related Art

Conventionally, a steam turbine test facility is provided to evaluate the performance of a steam turbine plant constituting a part of a thermal power plant or a nuclear power plant. Such a steam turbine test facility includes a test steam turbine. The test steam turbine is used to simulate the behavior of a steam turbine installed in the steam turbine plant in such a manner that any particular one of a high-pressure turbine, a medium-pressure turbine, and a low-pressure turbine of the steam turbine plant is operated on a simulation basis. The steam turbine test facility performs performance and reliability verification tests such as a high-load test and a low-load test to evaluate the performance and reliability of the test steam turbine, thus evaluating the performance and reliability of the steam turbine plant.

(1) High-load Test

In the high-load test in which the power obtained by steam exceeds mechanical loss, the test steam turbine can increase and maintain its rotational speed by itself. In the high-load test, therefore, a generator and a dynamometer are connected to the test steam turbine to collect the output power. This test is performed to measure necessary data to evaluate the performance and reliability of the steam turbine plant. The data to be measured includes stress generated in a rotor blade, a steam flow in the steam turbine, and so on.

(2) Low-load Test

When the load (steam flow rate) on the steam turbine falls to a fixed value or below and the steam turbine has long rotor blades (for example, in the case of a low-pressure turbine), a steam vortex flow may develop on the downstream side thereof, thereby generating random vibration on the steam turbine. In view of this, the low-load test is performed to evaluate the reliability of the steam turbine plant inclusive of effects that is produced by such random vibration.

The low-load test is performed to measure necessary data to evaluate the performance and reliability of the steam turbine plant when the load on the test steam turbine is equal to or lower than the load at which random vibration occurs (that is, in a low-load state). The data to be measured includes stress generated in a rotor blade, a steam flow in the steam turbine, and so on. In the low-load test, if the power obtained by steam falls below mechanical loss, the test steam turbine cannot maintain its rotational speed by itself. To cope with such inconvenience, conventionally, a drive turbine and a motor are connected to the test steam turbine to maintain the rotational speed of the test steam turbine.

(3) Load Dump Test

The load dump test during which the load on a nuclear reactor and a steam turbine is disconnected is performed in a nuclear power plant. When the load on the steam turbine is disconnected, the pressure in the steam turbine suddenly decreases to cause the steam extracted from the main steam to flow reversely (flashback), thereby generating an unsteady steam flow inside the steam turbine. A fluid force resulting from this unsteady steam flow creates an exciting force and thus flashback vibration occurs on the rotor blades.

Further, as proved in recent years, when the main steam is interrupted, the steam turbine enters an extremely low load state, the steam vortex flow generates random vibration, and the random vibration is superimposed on flashback vibration, with the result that a large vibration force occurs on the rotor blades.

Then, in order to evaluate the reliability of the steam turbine plant inclusive of effects that is produced by the flashback vibration and random vibration in the load dump test, it is desirable to perform the load dump test by using the steam turbine test facility.

As described above, the high-load test is performed in such manner that a generator and a dynamometer are connected to the test steam turbine to collect the generated power. On the other hand, the low-load test is performed in such manner that a drive turbine and a motor are connected to the test steam turbine to maintain the rotational speed of the test steam turbine.

However, it is known that in the load dump test, immediately after the load is disconnected (that is, the generator load is disconnected), the rotational speed of the actual steam turbine temporarily rises (overspeed).

On the other hand, the behavior of the test steam turbine appearing after disconnection of the load does not coincide with that of the actual steam turbine because they are different in inertia. Even when a drive turbine and a motor are connected to the test steam turbine so as to maintain the rotational speed with the load disconnected (that is, in a load disconnection state), it is not possible to precisely simulate transitional changes of the rotational speed of the actual steam turbine. For example, the transitional changes include overspeed generated immediately after the load on the actual steam turbine is disconnected.

Specifically, with the conventional test steam turbine to which a common drive turbine and a motor are connected, it is not possible to precisely simulate the behavior appearing when the load on the actual steam turbine is disconnected.

Therefore, with the conventional test steam turbine, it is not possible to accurately evaluate an influence of flashback vibration and random vibration generated when the load is disconnected.

A generator and a dynamometer are connected to the test steam turbine in the high-load test while a drive turbine and a motor are connected to the test steam turbine in the low-load test and the load dump test. Therefore, it is necessary to change devices to be connected to the test steam turbine each time the high-load test, low-load test, or load dump test is performed. This will decrease the efficiency of tests for performance and reliability verification, inclusive of the above tests.

SUMMARY OF THE INVENTION

It is an object of the present invention is to provide a steam turbine test facility including a test steam turbine, in which the behavior of an actual steam turbine can be precisely simulated particularly in the load dump test and the efficiency of tests for performance and reliability verification can be improved.

In order to solve the above-mentioned problem, the present invention provides a steam turbine test facility including a test steam turbine having a motor-generator connected thereto. The motor-generator can operate as either a generator in the generator mode or a motor in the motor mode, and control the rotational speed of the steam turbine.

According to the present invention, it is possible to provide a steam turbine test facility including a test steam turbine, in which the behavior of an actual steam turbine can be precisely simulated particularly in the load dump test and the efficiency of tests for performance and reliability verification can be improved.

DESCRIPTION OF THE PREFERRED EMBODIMENTS

Embodiments of the present invention will be described in detail below with reference to the accompanying drawings.

Figure 1A:
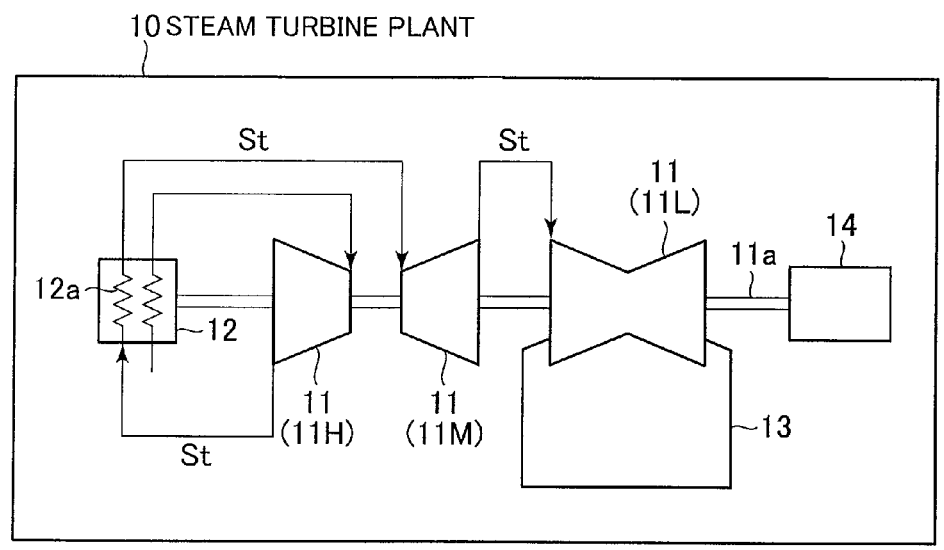
FIG. 1A illustrates a configuration of a common steam turbine plant.
Figure 1B:
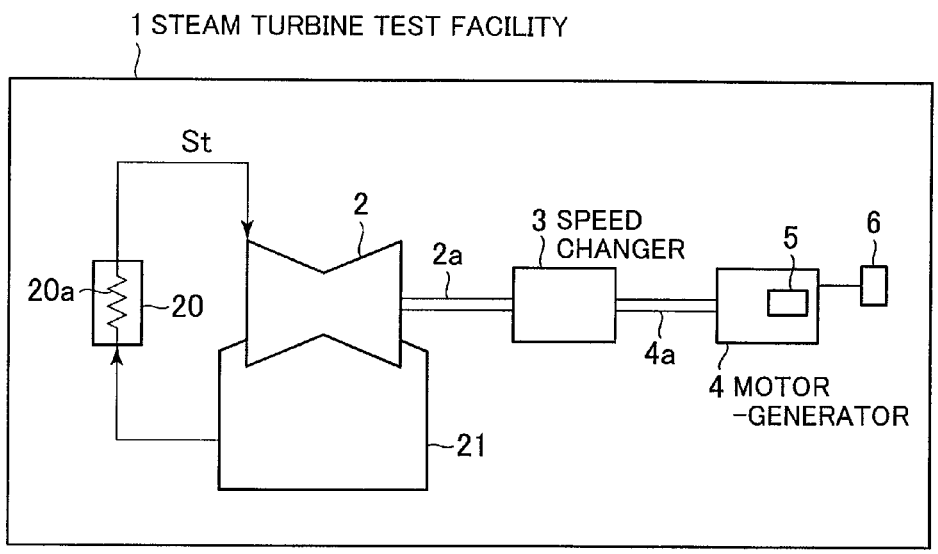
FIG. 1B illustrates an exemplary configuration of a steam turbine test facility.

FIG. 1A illustrates a configuration of a common steam turbine plant, and FIG. 1B illustrates an exemplary configuration of a steam turbine test facility.

As illustrated in FIG. 1A, a common steam turbine plant 10 includes a high-pressure turbine 11H, a medium-pressure turbine 11M, and a low-pressure turbine 11L, as real steam turbines (steam turbines 11). In the thus-configured steam turbine plant 10, steam St generated by a boiler 12 generates work in the high-pressure turbine 11H, flows into a reheater 12a included in the boiler 12 for reheating, and flows into the medium-pressure turbine 11M. The steam St generates work in the medium-pressure turbine 11M, flows into the low-pressure turbine 11L, generates work in the low-pressure turbine 11L, and flows into a condenser 13. When the steam St generates work in the high-pressure turbine 11H, the medium-pressure turbine 11M, and the low-pressure turbine 11L in this way, an output shaft 11a rotates.

A device serving as a load (a load device 14) is connected to the output shaft 11a which rotates to produce a driving force. The load device 14 is, for example, a generator.

Before actual operation, the steam turbine plant 10 configured as illustrated in FIG. 1A needs to be evaluated for performance and reliability as required. In some cases, performance and reliability verification tests are performed in a steam turbine test facility including a test steam turbine which simulates the behavior of the steam turbines 11.

As illustrated in FIG. 1B, in a steam turbine test facility 1 according to the present embodiment, a motor-generator 4 including a control unit 5 is connected via a speed changer 3 to an output shaft 2a of a test steam turbine 2 which simulates the behavior of the actual steam turbines 11 (refer to FIG. 1A) included in the steam turbine plant 10 under tests for performance and reliability verification. The motor-generator 4 is connected with a battery 6 (or an ordinary power supply system). The battery 6 supplies electric power to the motor-generator 4 while it is operating as a motor (hereinafter referred to as motor mode), and stores electric power generated by the motor-generator 4 while it is operating as a generator (hereinafter referred to as generator mode).

For example, when the actual steam turbines 11 under tests for performance and reliability verification include the high-pressure turbine 11H, the medium-pressure turbine 11M, and the low-pressure turbine 11L as illustrated in FIG. 1A, the steam turbine test facility 1 may preferably include the test steam turbine 2 which simulates the low-pressure turbine 11L as illustrated in FIG. 1B. However, the test steam turbine 2 may simulate the medium-pressure turbine 11M or the high-pressure turbine 11H. Further, the test steam turbine 2 may simulate a part of the low-pressure turbine 11L (the high-pressure turbine 11H or the medium-pressure turbine 11M). The actual steam turbines 11 included in the steam turbine plant 10 are referred to as real steam turbines 11 to be distinguished from the test steam turbine 2.

In the steam turbine test facility 1 configured as illustrated in FIG. 1B, the steam St generated by a boiler 20 flows from a condenser 21 into the reheater 20a thereof for reheating, and then is supplied to the test steam turbine 2. The steam St generates work in the test steam turbine 2 and flows back into the condenser 21. When the steam St generates work in the test steam turbine 2 in this way, the output shaft 2a rotates. Hereinafter, the rotational speed of the output shaft 2a is referred to as rotational speed of the test steam turbine 2.

The speed changer 3 suitably changes the rotational speed of a rotating shaft 4a at a predetermined deceleration rate (or acceleration rate) to transmit the power of the motor-generator 4 to the output shaft 2a.

The deceleration rate (or acceleration rate) of the speed changer 3 is suitably set based on the characteristics of the rotational speed of the test steam turbine 2 and the characteristics of the rotational speed of the motor-generator 4.

Further, depending on the characteristics of the rotational speed of the test steam turbine 2 and the characteristics of the rotational speed of the motor-generator 4, the speed changer 3 is not necessary. In this case, the motor-generator 4 is directly connected to the output shaft 2a.

Figure 2:
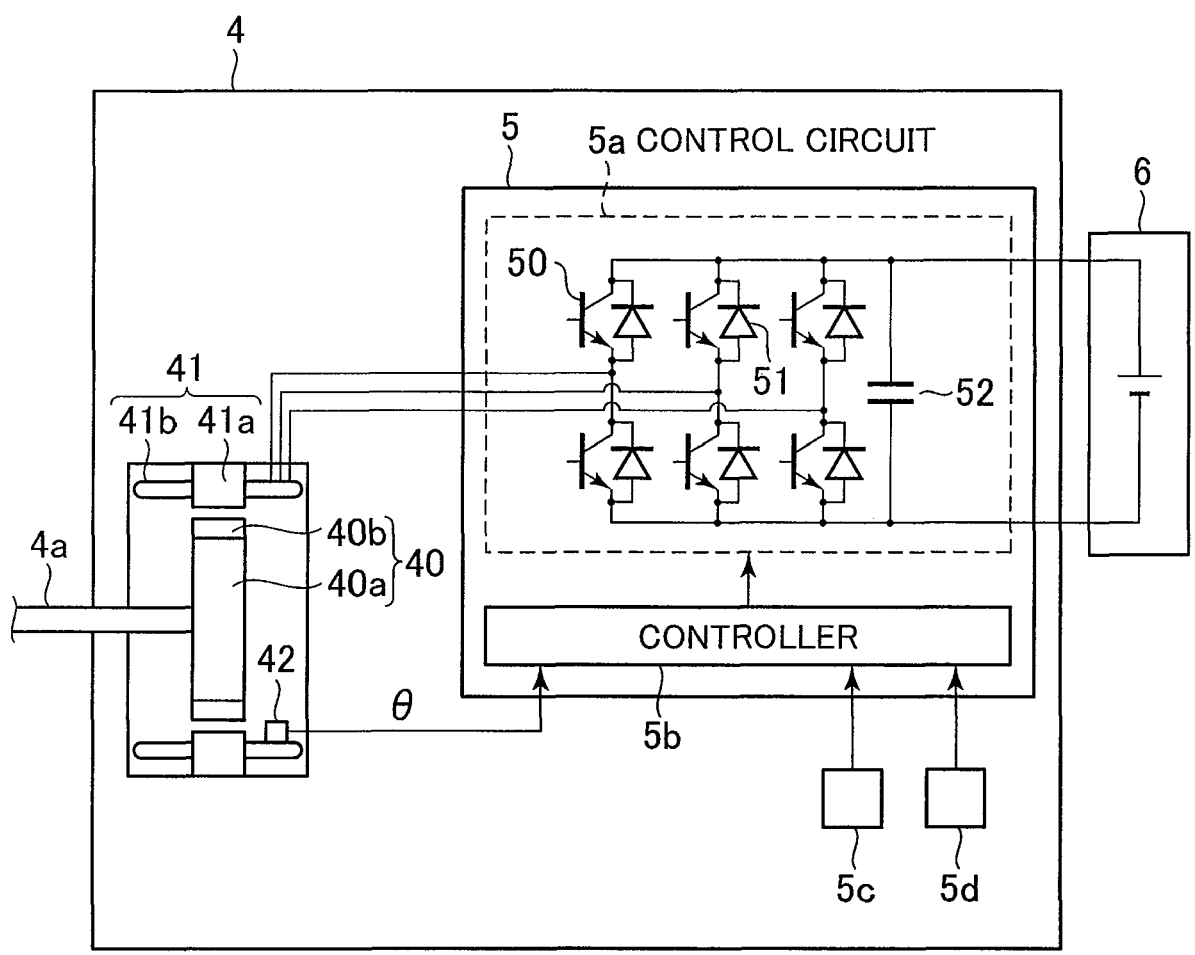
FIG. 2 illustrates an exemplary configuration of a motor-generator and a control unit.

FIG. 2 illustrates an exemplary configuration of the motor-generator and the control unit 5. The motor-generator 4 operates as either a three-phase ac motor in the motor mode or a three-phase ac generator in the generator mode.

As illustrated in FIG. 2, the motor-generator 4 includes a rotor 40 rotating integrally with the rotating shaft 4a. The rotor 40 is composed of a rotor core 40a and permanent magnets 40b which form magnetic poles.

The rotor core 40a is connected with the speed changer 3 (refer to FIG. 1B) via the rotating shaft 4a, and rotates with the rotation of the output shaft 2a of the test steam turbine 2 (refer to FIG. 1B).

A stator 41 is composed of a stator core 41a and three-phase stator windings 41b wound around the stator core 41a. A housing of the motor-generator 4 is attached to the outer circumference side of the stator 41.

The three-phase stator windings 41b are electrically connected with the control unit 5.

Further, the motor-generator 4 includes an angular sensor 42 which detects a rotational angle θ of the rotor 40. The angular sensor 42 is, for example, a resolver which inputs the detected rotational angle θ of the rotor 40 to the control unit 5.

The control unit 5 included in the motor-generator 4 includes a control circuit 5a and a controller 5b which controls the control circuit 5a.

The control circuit 5a includes the inverter circuit composed of a three-phase bridge circuit composed of switching elements 50 and diodes 51.

A battery 6 is connected to the control circuit 5a in parallel with the inverter circuit. A capacitor 52 is connected between the inverter circuit and the battery 6 to smooth currents flowing in the control circuit 5a.

The controller 5b includes, for example, a microcomputer and a peripheral circuit. The microcomputer includes a central processing unit (CPU), a read only memory (ROM), and a random access memory (RAM). The controller 5b executes a program stored in the ROM to control the circuit 5a.

The controller 5b is provided with an input unit 5c for inputting data, such as a keyboard and a mouse, and a display unit 5d for displaying an input result, such as a display device.

The controller 5b performs switching operation of the switching elements 50 of the control circuit 5a to generate a PWM (pulse width modulation) signal for driving the motor-generator 4 in the motor mode, generates three-phase currents from a dc current of the battery 6 based on the PWM signal, and supplies the three-phase currents to the three-phase stator windings 41b.

The controller 5b also performs time-differential of the rotational angle θ of the rotor 40 to calculate the rotational speed ω of the rotor 40. The angle θ is input from the angular sensor 42. Then, the controller 5b controls the PWM signal so that the rotor 40 rotates at a predetermined rotational speed ω.

Thus, the controller 5b can rotate the rotor 40 of the motor-generator 4 at any rotational speed ω. Since the rotor 40 rotates integrally with the rotating shaft 4a which connects with the output shaft 2a (refer to FIG. 1B) via the speed changer 3 (refer to FIG. 1B), the controller 5b can rotate the output shaft 2a at any rotational speed ωs. That is, the controller 5b can rotate the test steam turbine 2 at any rotational speed ωs.

When the power input via the output shaft 2a (refer to FIG. 1B) is smaller than the power obtained while the test steam turbine 2 (refer to FIG. 1B) is rotating at the rotational speed ωs set by the control unit 5, that is, when a small load is input, the motor-generator 4 operates in the motor mode.

On the contrary, when the power input via the output shaft 2a (refer to FIG. 1B) becomes larger than the power obtained while the test steam turbine 2 (refer to FIG. 1B) is rotating at the rotational speed ωs, that is, when a large load is input, the motor-generator 4 automatically changes from the motor mode to the generator mode.

When the steam flow rate is increased, the power of the test steam turbine 2 (refer to FIG. 1B) also increases to enter the high-load state, and accordingly the motor-generator 4 operates in the generator mode.

On the contrary, when the steam flow rate is decreased, the power of the test steam turbine 2 also decreases to enter the low-load state, and accordingly the motor-generator 4 automatically changes from the generator mode to the motor mode.

Further, when steam supply is interrupted, the test steam turbine 2 enters a load disconnection state. In this case, the test steam turbine 2 enters the extremely low load state, and the motor-generator 4 automatically changes from the generator mode to the motor mode.

The above-mentioned configuration allows the motor-generator 4 to operate in the generator mode, for example, in the high-load test of the test steam turbine 2 (refer to FIG. 1B) to collect the power of the test steam turbine 2.

Further, when the test steam turbine 2 (refer to FIG. 1B) enters the low-load state (extremely low load state) in the low-load test and the load dump test, the motor-generator 4 automatically changes from the generator mode to the motor mode allowing the test steam turbine 2 to be driven and rotated at any rotational speed. Thus, the rotational speed of the test steam turbine 2 can be maintained.

Thus, in the steam turbine test facility 1 (refer to FIG. 1B) according to the present embodiment, it is not necessary to change device connections in each cases of the high-load test, low-load test, and load dump test of the test steam turbine 2 (refer to FIG. 1B). The present invention provides an outstanding effect that the efficiency of tests for performance and reliability verification (high-load test, low-load test, and load dump test) can be improved by utilizing the test steam turbine 2 included in the steam turbine test facility 1.

The control unit 5 (refer to FIG. 2) is suitably provided with, for example, a function to change the rotational speed ωs of the test steam turbine 2 (refer to FIG. 1B) in the load dump test based on a speed change pattern which is arbitrarily set with the time progress of the load dump test.

Figure 3A:
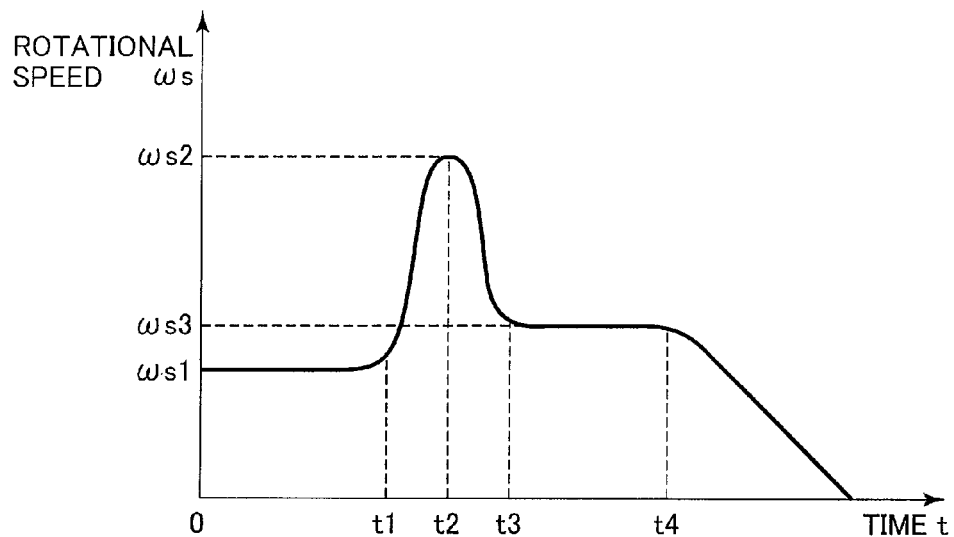
FIG. 3A is a graph illustrating a profile of the rotational speed of a real steam turbine.

FIG. 3A is a graph illustrating a profile of the rotational speed of the real steam turbine. The vertical axis is assigned the rotational speed ωs of the real steam turbines 11 and the horizontal axis is assigned a time (elapsed time) t.

Figure 3B:
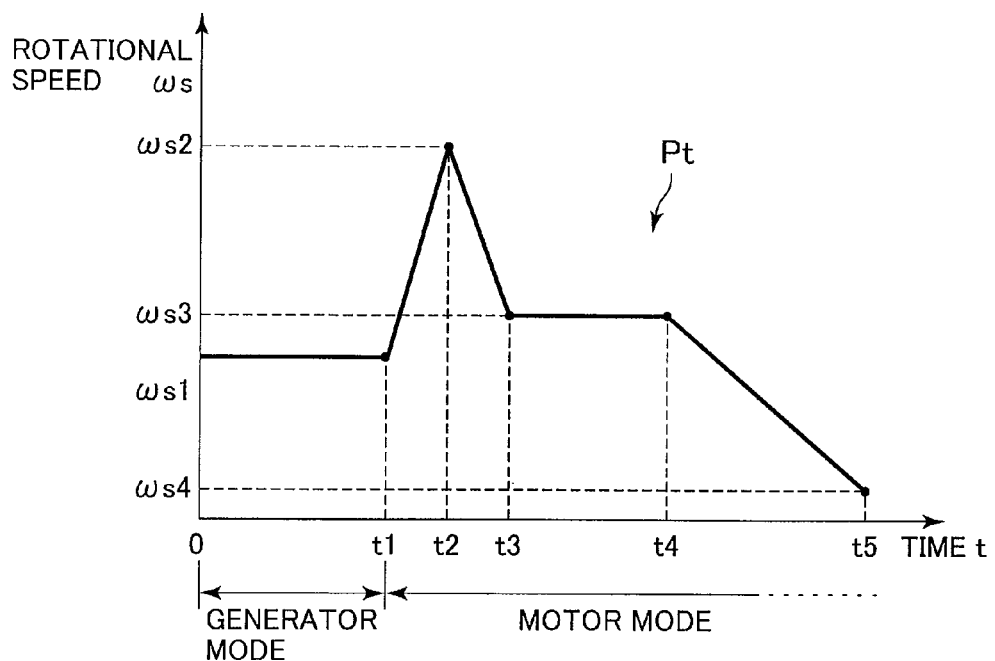
FIG. 3B is a graph illustrating an exemplary speed change pattern in the load dump test.

FIG. 3B is a graph illustrating an exemplary speed change pattern in the load dump test.

The horizontal axis of the graph in FIG. 3B denotes the time (elapsed time) t in the load dump test. A time 0 denotes the time when the load dump test is started. The vertical axis denotes the rotational speed ωs of the test steam turbine.

As illustrated in FIG. 3A, for example, when the load is disconnected (that is, the generator load is disconnected) at a time t1 while the real steam turbines 11 (refer to FIG. 1A) is rotating at a rotational speed ωs1, the rotational speed temporarily rises to ωs2 at a time t2.

At the time t1, the load is disconnected and accordingly steam supply is interrupted. Therefore, at the time t2 and after, the real steam turbines 11 are decelerated. At a time t3, the rotational speed falls to ωs3 slightly higher than the rotational speed ωs1. The real steam turbines 11 rotate at ωs3 for a while. At a time t4 and after, the real steam turbines 11 are gradually decelerated.

In the present embodiment, the control unit 5 (refer to FIG. 2) included in the motor-generator 4 changes the rotational speed ω of the rotor 40 (refer to FIG. 2) of the motor-generator 4 based on, for example, a speed change pattern which is arbitrarily set with the time progress of the load dump test to precisely simulate a profile of the rotational speed of the real steam turbines 11 (refer to FIG. 1A) in the load dump test.

As illustrated in FIG. 2, the rotor 40 of the motor-generator 4 rotates integrally with the rotating shaft 4a which is connected with the output shaft 2a via the speed changer 3, as illustrated in FIG. 1B. Therefore, the control unit 5 can set the rotational speed ωs of the test steam turbine 2 by setting the rotational speed ω of the rotor 40 in consideration of the deceleration rate (or acceleration rate) of the speed changer 3.

Specifically, the control unit 5 changes the rotational speed ω of the rotor 40 based on a speed change pattern which is arbitrarily set, thus changing the rotational speed ωs of the test steam turbine 2 based on the pattern.

As illustrated in FIG. 3B, an operator sets the rotational speed ωs of the test steam turbine 2 (refer to FIG. 1B) before the time t1 at which the load is disconnected, and a profile of the rotational speed ωs of the test steam turbine 2 after the time t1, with the time progress of the load dump test; and inputs them in the controller 5b (refer to FIG. 2) via the input unit 5c (refer to FIG. 2), as a speed change pattern Pt.

For example, by setting rotational speeds ωs (illustrated as rotational speeds ωs2 to ωs4 in FIG. 3B) at typical times after the time t1 (illustrated as times t2 to t5 in FIG. 3B), the operator can set the speed change pattern Pt with the time progress of the load dump test.

The number of typical times in the time progress of the load dump test are not limited to five (times t1 to t5 illustrated in FIG. 3B), but may be suitably increased or decreased as required.

Since the test steam turbine 2 (refer to FIG. 1B) enters the load disconnection state when steam supply is interrupted, steam supply to the test steam turbine 2 is interrupted at the time t1.

Thus, the speed change pattern Pt (refer to FIG. 3B) input via the input unit 5c illustrated in FIG. 2 is stored in a storage unit (not illustrated) of the controller 5b. The controller 5b controls the motor-generator 4 based on the stored speed change pattern Pt.

Specifically, the control unit 5 (refer to FIG. 1B) changes the rotational speed ωs of the test steam turbine 2 (refer to FIG. 1B) based on the arbitrarily set speed change pattern Pt.

The control unit 5b (refer to FIG. 2) maintains the rotational speed of the motor-generator 4 (refer to FIG. 1B) to ωs1, which operates in the generator mode till the time t1 at which steam supply to the steam turbine 2 (refer to FIG. 1B3) is interrupted. At the time t1, the controller 5b controls the PWM signal generated by the control circuit 5a (refer to FIG. 2) so that the rotational speed of the test steam turbine 2 reaches ωs2 at the time t2.

At the time t1, steam supply to the test steam turbine 2 is interrupted, the test steam turbine 2 enters the extremely low load state, and the motor-generator 4 changes from the generator mode to the motor mode. Then, the control unit 5 included in the motor-generator 4 can change the rotational speed ωs of the test steam turbine 2 in the extremely low load state.

Further, the controller 5b (refer to FIG. 2) controls the PWM signal to change with time the rotational speed ωs of the test steam turbine 2 so that the rotational speed ωs of the test steam turbine 2 (refer to FIG. 1B) falls to set rotational speeds ωs3 and ωs4 at the times t3 to t5.

When the control unit 5 (refer to FIG. 2) changes the rotational speed ωs of the test steam turbine 2 (refer to FIG. 1B) based on the speed change pattern Pt in this way, the test steam turbine 2 can precisely simulate a profile of the rotational speed ωs of the real steam turbines 11 (refer to FIG. 1A) with the load disconnected.

This configuration, with the use of the test steam turbine 2 (to refer to FIG. 1B), makes it possible to accurately evaluate an influence of flashback vibration and random vibration generated in the real steam turbines 11 (refer to FIG. 1A) with the load disconnected.

As illustrated in FIG. 2, although the controller 5b of the control unit 5 according to the present embodiment includes the input unit 5c and the display unit 5d, the configuration of the controller 5b is not limited thereto. For example, the controller 5b may be provided with a communication terminal (not illustrated) connected thereto instead of the input unit 5c and the display unit 5d to enable communication with a personal computer (not illustrated).

In this case, if the controller 5b can receive the speed change pattern Pt (refer to FIG. 3B) input in the personal computer (not illustrated) by the operator via the communication terminal (not illustrated), the controller 5b can be provided with a similar user-interfacing function to the one attained by the input unit 5c and the display unit 5d.

For example, it is also possible that the control unit 5 (refer to FIG. 2) can input a signal denoting that steam supply to the test steam turbine 2 (refer to FIG. 1B) is interrupted, and the control unit 5 utilizes the signal input as a trigger for changing the rotational speed ωs of the test steam turbine 2 based on the speed change pattern Pt.

This configuration allows the control unit 5 to start changing the rotational speed ωs of the test steam turbine 2 accurately in synchronization with the interruption of steam supply to the test steam turbine 2.

Therefore, the test steam turbine 2 can more accurately simulate the behavior of the real steam turbines 11 (refer to FIG. 1A).

For example, in the electric power industry, it is common that nuclear power plants are used for base load operation, and thermal power plants are used to control electric power supply in response to the electric power demand on the load side.

With such an operation, since a wide load range is required for steam turbines of thermal power plants to perform load-following operation, load fluctuation increases making random vibration more likely to occur.

Further, with the trend that the number of casings is decreased to elongate the rotor blades of steam turbines of thermal power plants, random vibration is more likely to occur.

Further, when the ratio of nuclear power generation to the total power production increases making it difficult to control power supply by thermal power plants, control of power supply by nuclear power plants is also considered. In this case, a wide load range is required for steam turbines of nuclear power plants. Accordingly, load fluctuation of a steam turbine of a nuclear power plant increases making random vibration more likely to occur.

Random vibration generates large vibrational stress which may cause damage to the rotor blades. When the load is disconnected as described above, for example, random vibration is superimposed on flashback vibration generated by flashback of the steam extracted from the main steam, and acts on the rotor blades as a large vibration force.

As described above, random vibration may be generated in the steam turbine of a common power plant. Further, since random vibration superimposed on flashback vibration has a large influence, it is desirable to take effective measures against random vibration and flashback vibration. Therefore, it is important to accurately evaluate an influence of random vibration and flashback vibration by using the test steam turbine.

Since the test steam turbine 2 (refer to FIG. 1B) included in the steam turbine test facility 1 according to the present embodiment can precisely simulate the behavior of the real steam turbines 11 (refer to FIG. 1A), it is possible to accurately evaluate the performance of the real steam turbines 11 through performance and reliability verification tests using the test steam turbine 2. This evaluation makes it possible to obtain an index for taking effective measures against random vibration and flashback vibration generated in the real steam turbines 11 with the load disconnected.

Although the load dump test has been mainly described, an effect of performing the low-load test using the test steam turbine 2 (referring to FIG. 1B) according to the present embodiment will be described below.

As described above, in the low-load test, when the steam flow rate of the test steam turbine 2 (refer to FIG. 1B) falls to a fixed value or lower than that and accordingly the power obtained by the steam falls below mechanical loss, the test steam turbine 2 may not maintain its rotational speed by itself. In this case, measurement of random vibration is not possible.

According to the present embodiment, even when the test steam turbine 2 cannot maintain its rotational speed by itself, the connected motor-generator 4 can maintain the rotational speed of the test steam turbine 2, thus allowing measurement of random vibration.

A dynamometer and a drive turbine that are conventionally connected to the test steam turbine 2 have inferior rotational speed controllability. This makes it difficult to accurately maintain a predetermined rotational speed of the test steam turbine 2. However, the motor-generator 4 (refer to FIG. 1B)

provides favorable rotational speed controllability, allowing the test steam turbine 2 to accurately maintain a predetermined rotational speed.

What is claimed is:

1. A steam turbine test facility for performing tests for performance and reliability verification of a steam turbine plant comprising:
    at least one test steam turbine configured to simulate the behavior of a real steam turbine included in the steam turbine plant; and
    a motor-generator connected to the at least one test steam turbine and configured to change operation between a motor mode in which the motor-generator operates as a motor and a generator mode in which the motor-generator operates as a generator, depending on the extent of load in a load test of the test steam turbine.

2. The steam turbine test facility according to claim 1, wherein the motor-generator includes a control unit configured to control the motor-generator so as to change the rotational speed of the test steam turbine based on an arbitrarily set speed change pattern.

3. The steam turbine test facility according to claim 2, wherein the control unit is configured to control the motor-generator so that the speed change pattern is set such that the test steam turbine in the load disconnection state simulates a time-profile of the rotational speed of the real steam turbine with the load disconnected.

4. A low-load test method in a steam turbine test facility for performing tests for performance and reliability verification of a steam turbine plant, the facility having at least one test steam turbine configured to simulate the behavior of a real steam turbine included in the steam turbine plant and a motor-generator connected to the at least one test steam turbine and configured to change operation between a motor mode in which the motor-generator operates as a motor and a generator mode in which the motor-generator operates as a generator, depending on the extent of load in a load test of the test steam turbine of the test steam turbine, the test comprising the steps of:
    reducing the steam flow rate of the test steam turbine; and
    testing the test steam turbine in a low-load state.

5. A load dump test method in the steam turbine test facility for performing tests for performance and reliability verification of a steam turbine plant, the facility having at least one test steam turbine configured to simulate the behavior of a real steam turbine included in the steam turbine plant and a motor-generator connected to the at least one test steam turbine and configured to change operation between a motor mode in which the motor-generator operates as a motor and a generator mode in which the motor-generator operates as a generator, depending on the extent of load in a load test of the test steam turbine of the test steam turbine, the test comprising the steps of:
    interrupting steam supply to the test steam turbine; and
    testing the test steam turbine in a load disconnection state.

* * * * *